United States Patent [19]

Weidman et al.

[11] Patent Number: 5,530,603
[45] Date of Patent: Jun. 25, 1996

[54] FLOPPY-DISK AIR AND DUST DAM

[75] Inventors: Verne W. Weidman, West Chester; Daniel A. Jochym, Thorndale; Arthur J. Mattia, Elkins Park, all of Pa.

[73] Assignee: Unisys Corporation, Blue Bell, Pa.

[21] Appl. No.: 411,250

[22] Filed: Mar. 27, 1995

[51] Int. Cl.⁶ .............................. G11B 33/14; G11B 23/03
[52] U.S. Cl. ............................... 360/97.04; 360/97.02; 360/133
[58] Field of Search ............................ 360/97.04, 97.02, 360/133

[56] References Cited

U.S. PATENT DOCUMENTS

| | | | |
|---|---|---|---|
| 4,112,471 | 9/1978 | Pollard et al. | 360/97.02 |
| 4,691,257 | 9/1987 | Taguchi | 360/97.02 |
| 4,698,707 | 10/1987 | Heys, Jr. et al. | 360/97.02 |
| 4,907,111 | 3/1990 | Derman | 360/97.02 |
| 4,980,785 | 12/1990 | Talmadge | 360/97.02 |
| 5,086,422 | 2/1992 | Hagiya et al. | 369/75.1 |
| 5,122,918 | 6/1992 | Chao | 360/133 |
| 5,265,951 | 11/1993 | Kunar | 312/223.2 |
| 5,301,178 | 4/1994 | Okabe et al. | 369/77.1 |
| 5,335,217 | 8/1994 | Kaneda et al. | 360/97.04 X |

FOREIGN PATENT DOCUMENTS

| | | | |
|---|---|---|---|
| 62-231489 | 10/1987 | Japan | 360/97.04 |
| 62-270087 | 11/1987 | Japan | 360/97.04 |

*Primary Examiner*—John H. Wolff
*Attorney, Agent, or Firm*—Robert R. Axenfeld; Mark T. Starr

[57] ABSTRACT

An apparatus for blocking air and dust from entering a floppy disk drive. A floppy disk has a compressible non-porous dam (a non-porous foam strip material) attached to the front-tip edge of the floppy disk. When the floppy disk is inserted into the drive the dam compresses to conform to the volume of the drive opening. Accordingly, air as well as dust is blocked from the disk drive and air flow is improved within the computer cabinetry.

2 Claims, 3 Drawing Sheets

FLOPPY-DISK AIR AND DUST DAM

BACKGROUND OF THE INVENTION

1. Field of the Invention

The present invention relates to floppy disk drives, and more specifically, to a dam attached to a floppy disk, which, when inserted in to a computer disk drive blocks air and dust from entering the drive.

2. Related Art

FIG. 1 is a simplified block diagram showing air movement through a cabinet 102 housing components of a computer. The cabinet includes: components 104A-C, intake vents 106A-D, a 3.25" disk drive 108, a 5.25" floppy-drive 110, and an exhaust fan 116. Components 104A-C are typically those found in Personal Computers such as processor chips, boards and memory (e.g.,SIMMs).

Components 104A-C generate heat when operational. An exhaust fan 116 is used to cool components 104. The exhaust fan 116 produces constant negative pressure in the cabinet 102 causing primary air (shown as arrows within dashed lines 114) to enter vents 106 A-D. Before exiting the cabinet 102, via an opening of the exhaust fan 116, the primary air 114 flows across the components 104A-C, thereby dispersing heat and cooling components 104.

Several problems, associated with cooling components 104, arise due to the design of current floppy-disk drives 110. Most conventional floppy drives (e.g., 5.25") are open both front and back. Thus, the fan 116 can draw air (shown as arrows within dashed lines 112) through the floppy drive 110 allowing dust to accumulate on a drive read/write head (shown in FIG. 3 as 302). Dust can cause the drive read/write head to malfunction. Additionally, when a conventional floppy disk (not shown) is inserted into the dusty drive 110, the dust can deposit on the floppy disk leading to data errors.

U.S. Pat. No. 5,122,918 to Chao (the Chao patent) attempts to address the dust problem by employing a porous air filtrating element attached to floppy disk to filter dust out of the air which enters the disk drive 110. The Chao patent may help to prevent dust from entering the disk drive 110, but it does not address another significant problem: short circuiting of air flow.

From a computer system view, as shown in FIG. 1, having a disk drive 110, open front and back, directly across from the exhaust fan 116, short circuits air flow (shown as dotted lines and labelled 112) through the computer cabinet 102. In present personal computer manufacturing practice, this is typically the case. This, in turn, creates inadequate air flow across hot components 104, which leads to higher component temperatures within cabinet 102 thus inducing earlier failure of these components 104.

Today, as more memory SIMMs and faster processor chips are added to personal computers, the power consumed and thus converted to heat continues to increase. Therefore, what is needed is an apparatus that prevents foreign objects, such as dust, from entering the floppy drive 110, while preventing air from being short circuited in the cabinet 102.

SUMMARY OF THE INVENTION

The present invention is directed to an apparatus for blocking air and dust from entering a floppy disk drive. A floppy disk has a compressible non-porous dam (a non-porous foam strip material) attached to the front-tip edge of the floppy disk. When the floppy disk is inserted into the drive the dam compresses to conform to the volume of the drive opening.

Accordingly, air is blocked from the disk drive. As a result, more air volume is forced through air vents across computer components in the computer cabinet. Operation of the components is improved due to cooler atmospheric temperatures within the cabinet.

Additionally, as more memory SIMMs and faster processor chips are added to personal computers, the power consumed and thus converted to heat will continue to increase. The present invention will allow such components to be added to systems, without the need to employ dual cooling systems, liquid cooling, or more powerful cooling systems.

Another feature of the present invention is to block air flow into the disk drive, therefore no dust builds up inside the drive allowing better disk drive operation with less maintenance.

The air dam causes no damage to the floppy drive and is easily removable.

DETAILED DESCRIPTION OF THE PREFERRED EMBODIMENT

Figure 1:
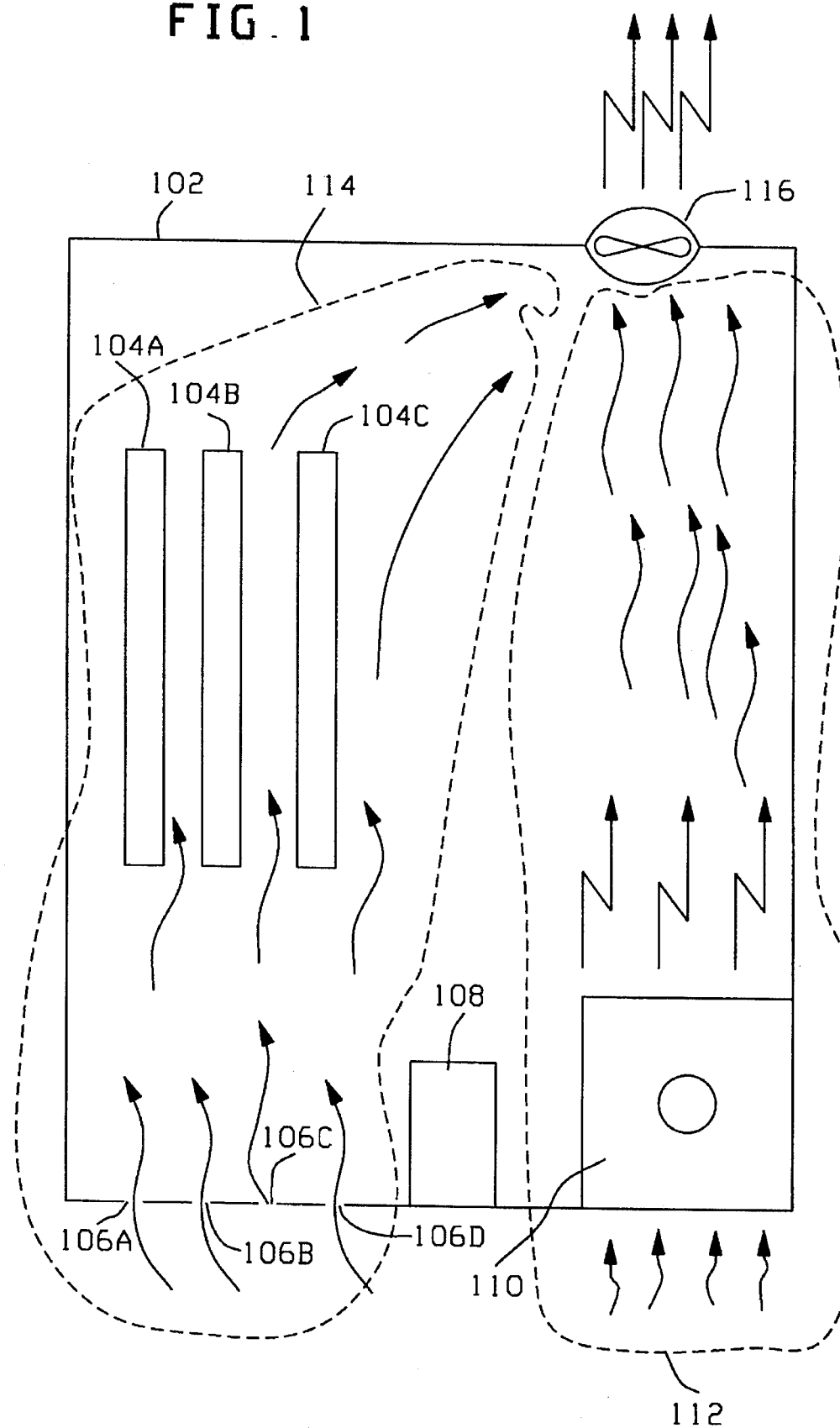
FIG. 1 is a simplified block diagram showing air movement through a cabinet housing components of a computer.
Figure 2:
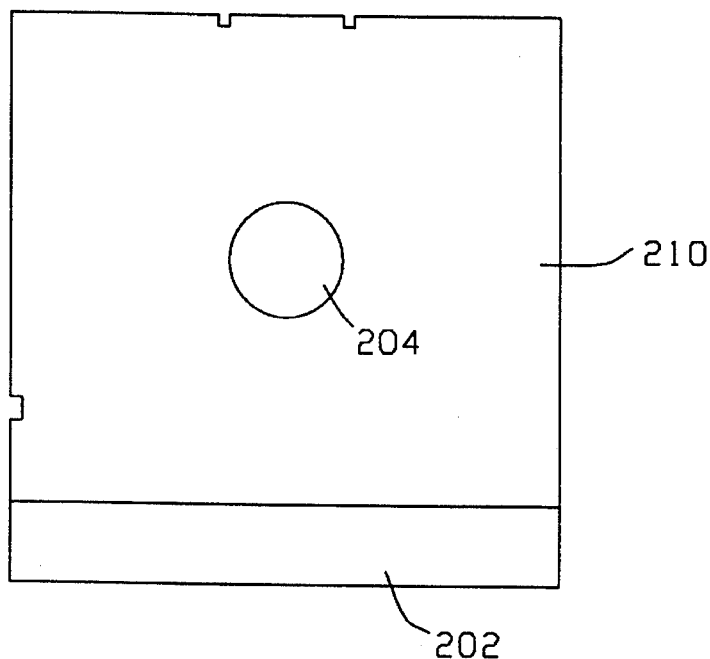
FIG. 2 illustrates a 5.25" floppy disk having a compressible non-porous dam attached to the front-tip edge of the floppy disk.
Figure 3:
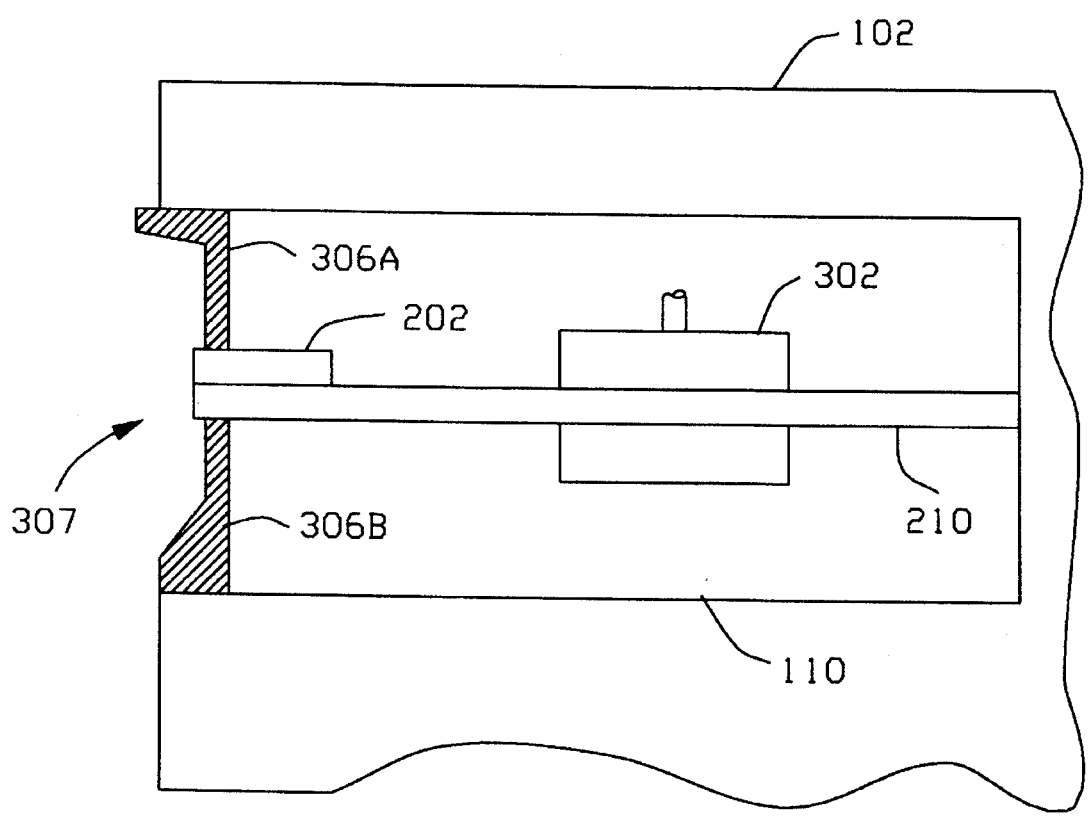
FIG. 3 is a side section view of the present invention installed in a disk drive.

FIG. 2 illustrates a 5.25" floppy disk 210 having a compressible non-porous dam 202 attached to the front-tip edge of the floppy disk 210. The floppy disk 210 is a standard jacketed magnetic disk. As shown in FIG. 3, when the disk 210 is inserted into the drive 110, the dam 202 compresses to conform to the volume of the drive opening 307. When inserted into the disk drive opening 307, the dam 202 is between all four walls 306A, 306B (only top and bottom walls are shown) of the disk drive opening 307. The stress due to the inherent elastic capability of the dam 202 material causes the dam 202 to continuously expand toward the side walls 306, filling any voids between the dam 202 and the side walls 306 of the disk opening 307. In other words, the dam 202 fits all contours of the disk opening 307, due to the compressible and elastic nature of the dam material. The dam 202, thereby, blocks air as well as dust from entering the drive 110.

In the preferred embodiment, dam 202 is a non-porous foam material. It is envisioned that the dam 202 could be made of other materials (e.g., molded plastic). For 5.25" disks 210, the dam 202 is approximately ¾" wide by ⅜" thick by 5.25" long. It is envisioned that other dimensions can be employed and that the dam can be also be attached to the front bottom edge of the floppy disk 210 or wrap around the top and bottom edge of the floppy disk 210.

Figure 4:
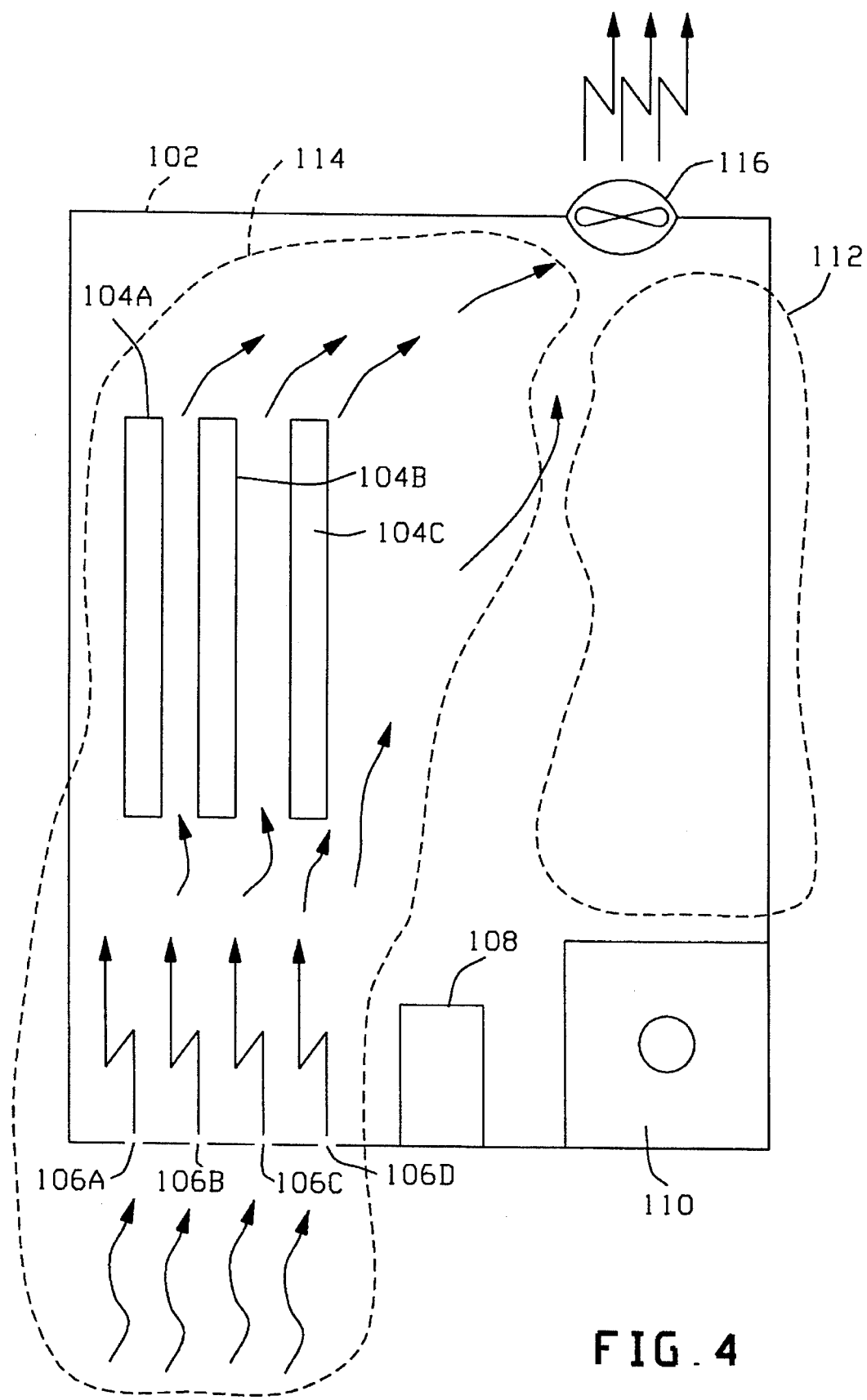
FIG. 4 is a simplified block diagram showing air movement through a cabinet employing a dam according to the present invention.

FIG. 4 is a simplified block diagram showing air movement through a cabinet 102 employing a dam 202 according to the present invention. Referring to FIG. 4, no air enters disk drive 110. Accordingly, more air volume is forced through vents 106 to flow across components 104 and exit via fan 116. In other words, proper air flow is reestablished within the computer cabinet 102. Proper air flow 114 to components 104 helps to prevent over heating of components 104 that leads to failure of components 104. Thus, according to the present invention, operation of components 104 is improved due to cooler atmospheric temperatures within cabinet 102 and longer computer life is established without dust entering disk drive 110.

Additionally, as more memory SIMMs and faster processor chips are added to personal computers, the power consumed and thus converted to heat will continue to increase. The present invention will allow such components to be added to systems, without the need to employ dual cooling systems, liquid cooling, or more powerful cooling systems.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for blocking air and dust from entering a disk drive, thereby causing proper air flow to be established throughout cabinetry in a computer system having a floppy disk drive, comprising:

a standard jacketed floppy disk to be inserted in a disk drive slot opening, said jacketed floopy disk having a rear edge and front edge, wherein said front edge is the last portion of said jacketed floppy disk to be inserted in said slot; and a dam, attached to said front edge of said jacketed floppy disk, said dam having a thickness substantially equal to a height of said disk drive slot, said dam having a width substantially equal to a width of said disk drive slot, said dam being composed of a non-porous, elastic and compressible material;

wherein when said jacketed floppy disk is inserted into said disk drive slot, said dam compresses to conform to said disk drive opening, whereby air and dust are blocked from entering said disk drive slot.

2. The apparatus of claim 1, wherein said dam is a non-porous foam.

* * * * *